United States Patent
Patton et al.

(10) Patent No.: US 9,256,649 B2
(45) Date of Patent: Feb. 9, 2016

(54) METHOD AND SYSTEM OF FILTERING AND RECOMMENDING DOCUMENTS

(71) Applicant: UT-Battelle LLC, Oak Ridge, TN (US)

(72) Inventors: Robert M. Patton, Knoxville, TN (US); Thomas E. Potok, Oak Ridge, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 305 days.

(21) Appl. No.: 13/920,803

(22) Filed: Jun. 18, 2013

(65) Prior Publication Data

US 2013/0339373 A1 Dec. 19, 2013

Related U.S. Application Data

(60) Provisional application No. 61/661,038, filed on Jun. 18, 2012.

(51) Int. Cl.
*G06F 17/30* (2006.01)

(52) U.S. Cl.
CPC ........ *G06F 17/3053* (2013.01); *G06F 17/3097* (2013.01)

(58) Field of Classification Search
CPC .......... G06F 17/3069; G06F 17/30616; G06F 17/30663; G06F 17/3071
USPC ......................................... 707/723, 749, 750
See application file for complete search history.

(56) References Cited

U.S. PATENT DOCUMENTS 7,483,892 B1 * 1/2009 Sommer et al.
8,543,576 B1 * 9/2013 Buryak et al. ................ 707/737

OTHER PUBLICATIONS

Wang et al.; "Inverse-Category-Frequency Based Supervised Term Weighting Schemes for Text Categorization"; supported by the 863 High-Tech Program; Dec. 28, 2011; 17 pages.*
Reed, Joel W., et al, "TF-ICF: A New Term Weighting Scheme for Clustering Dynamic Data Streams," presented at the Fifth International Conference on Machine Learning and Applications (ICMLA); Dec. 14-16, 2006 and published at the Computational Data Analytics Group website at aser.orn.gov, pp. 1-6 (2006).
Nakagawa, Akihito, et al, "An Implementation of a Knowledge Recommendation System based on Similarity among Users' Profiles," published in SICE 2002; Proceedings of the 41st SICE Annual Conference, pp. 1-2, Aug. 5-7, 2002.
Salton, Gerard, et al, "Introduction to Modern Information Retrieval," copyright 1983 by Mc-Graw Hill, Inc., pp. 59-71.
Wong, G. Salton, et al, "A Vector Space Model for Automatic Indexing," published in Communications of the ACM, vol. 18, No. 11, pp. 613-620 (Nov. 1975).

(Continued)

*Primary Examiner* — Monica Pyo
(74) *Attorney, Agent, or Firm* — Warner Norcross & Judd LLP

(57) ABSTRACT

Disclosed is a method and system for discovering documents using a computer and providing a small set of the most relevant documents to the attention of a human observer. Using the method, the computer obtains a seed document from the user and generates a seed document vector using term frequency-inverse corpus frequency weighting. A keyword index for a plurality of source documents can be compared with the weighted terms of the seed document vector. The comparison is then filtered to reduce the number of documents, which define an initial subset of the source documents. Initial subset vectors are generated and compared to the seed document vector to obtain a similarity value for each comparison. Based on the similarity value, the method then recommends one or more of the source documents.

7 Claims, 7 Drawing Sheets

(56) References Cited

OTHER PUBLICATIONS

Pagonis, John, et al, "Engene: A genetic algorithm classifier for content-based recommender systems that does not require continuous user feedback," 10th UKCI, Essex, pp. 1-6 (Sep. 2010).

Jones, Karen, "A statistical interpretation of term specificity and its application in retrieval," reprinted from Journal of Documentation, vol. 60, No. 5, pp. 493-502 (2004), and previously from Journal of Documentation, vol. 28, No. 1, pp. 11-21 (1972).

* cited by examiner

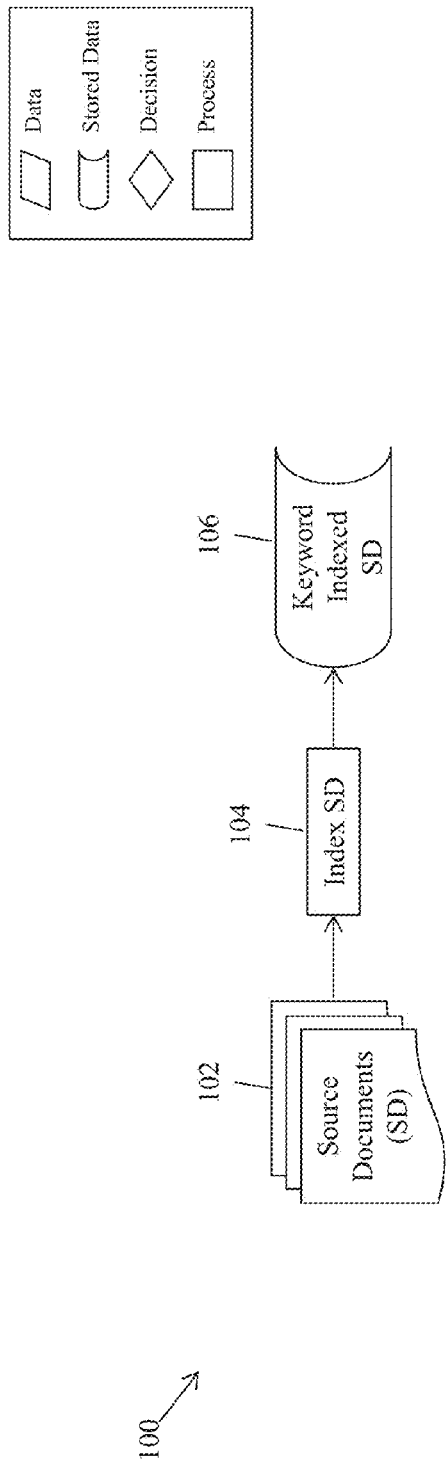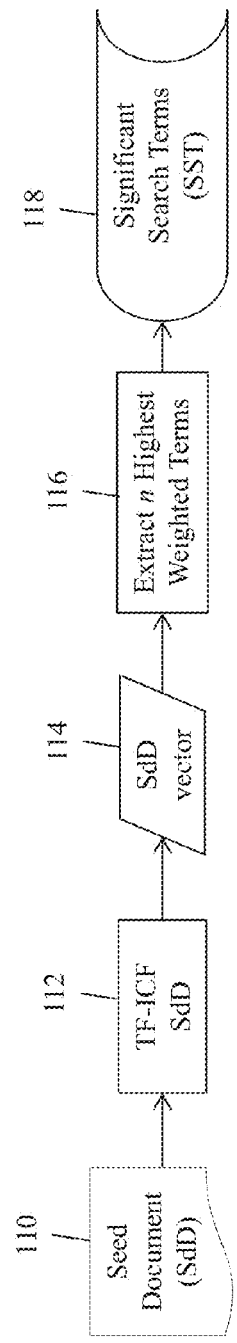

METHOD AND SYSTEM OF FILTERING AND RECOMMENDING DOCUMENTS

CROSS-REFERENCE TO RELATED APPLICATIONS

This application claims the benefit of U.S. Provisional Patent Application Ser. No. 61/661,038, entitled "A Method of Filtering and Recommending Documents", filed Jun. 18, 2012, which is herein incorporated by reference in its entirety. This application relates to U.S. Provisional patent application Ser. No. 61/584,965, filed Jan. 10, 2012, which is incorporated herein by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

1. Field of the Invention

The present disclosure relates to documents and more specifically to a system and method for filtering and recommending documents that are related to a topic of interest.

2. Description of the Related Art

One method of searching for electronic documents online is by entering one or more keywords into a search engine, such as a search engine webpage on the Internet. In general, the quality of such a search depends on the skill of the user and their ability to craft and submit an appropriate query. There are some systems that can return results from a keyword search and offer to find more documents based on a given result. If someone was interested in several different topics, they may need to spend a significant amount of time searching for and reviewing documents that may meet the search criteria, but may not be of any real interest.

Earlier works by Potok et al., address the need for automated document searching and the following three references are incorporated by reference as if included here at length. U.S. Pat. No. 7,805,446, "Agent-based Method for Distributed Clustering of Textual Information" to Potok et al.; U.S. Pat. No. 7,693,903, "Method for Gathering and Summarizing Internet Information" to Potok et al.; and U.S. Pat. No. 7,937,389, "Dynamic Reduction of Dimensions of a Document Vector in a Document Search and Retrieval System", to Jiao and Potok.

Document clustering is an enabling technique for many machine learning applications, such as information classification, filtering, routing, topic tracking, and new event detection. Today, dynamic data stream clustering poses significant challenges to traditional methods. Typically, clustering algorithms use the Vector Space Model (VSM) to encode documents. The VSM relates terms to documents, and since different terms have different importance in a given document, a term weight is associated with every term. These term weights are often derived from the frequency of a term within a document or set of documents. Many term weighting schemes have been proposed. Most of these existing methods work under the assumption that the whole data set is available and static. For instance, in order to use the popular Term Frequency-Inverse Document Frequency (TF-IDF) approach and its variants, one needs to know the number of documents in which a term occurred at least once (document frequency). This requires a prior knowledge of the data, and that the data set does not change during the calculation of term weights.

The need for knowledge of the entire data set significantly limits the use of these schemes in applications where continuous data streams must be analyzed in real-time. For each new document, this limitation leads to the update of the document frequency of many terms and therefore, all previously generated term weights needs recalibration. For N documents in a data stream, the computational complexity is $O(N^2)$, assuming that the term space M per document is much less than the number of documents. Otherwise, the computational complexity is $O(N^2 M \log M)$, where $O(M \log M)$ computations are needed to update a document.

Using the weighting scheme called Term Frequency-Inverse Corpus Frequency (TF-ICF) addresses the problem of finding and organizing information from dynamic document streams. TF-ICF does not require term frequency information from other documents within the set and thus, it can process document vectors of N streaming documents in linear time.

The widely used, current term weighting schemes generally all require knowledge of the entire document collection. In other words, if a TF-IDF based method is used to generate document representation, a newly arriving document requires the weights of existing document vectors to be recalculated. Consequently, any applications that rely on the document vectors will also be affected. This can significantly hinder their use in applications where dynamic data streams need to be processed in real-time. TF-ICF generates document representations independently without knowledge of the document stream being examined. Its computational complexity is $O(N)$.

BRIEF SUMMARY OF THE INVENTION

The system and method includes searching within a set of multiple source documents to find a subset of documents from the source document set that are closely related to one or more of the seed documents. The disclosed system and method can find source documents that are similar to the seed documents, and return the results. The results can be sorted, further filtered, and recommendations can be made.

This method is capable of comparing a large number of dynamic source documents to one or multiple seed document(s) chosen by a user to determine which source documents are relevant to user. Recommendations of source documents can be made based on the similarity of the seed document(s) to the source documents. That is, the individual seed document vectors and their similarity to the source documents can be preserved.

Disclosed is a method and system for discovering documents, i.e. on-line documents, using a computer and bringing them to the attention of a human observer. The system may include a computer with a storage device, a processor, an input device, and a display device. The computer may be programmed with a series of instructions that, when executed, cause the computer to perform a series of method steps. Using the method, the computer obtains a seed document from the input device, processes the seed document by removing the stop words and stemming the terms, generates a seed document vector with a plurality of weighted terms using term frequency-inverse corpus frequency weighting, obtains a keyword index for a plurality of source documents, determines a number of significant search terms from the seed document and filters out some of the terms to define an initial subset of the source documents, generates initial subset vectors and compares each of the initial subset vectors to the seed document vector to obtain a similarity value for each comparison, and recommends one or more of the source documents from the initial subset based on the similarity value, i.e. displaying information about the data for the human observer.

In another embodiment, the method includes using multiple seed documents to recommend one or more of the source documents.

BRIEF DESCRIPTION OF THE DRAWINGS

A more complete understanding of the preferred embodiments will be more readily understood by reference to the following detailed description when considered in conjunction with the accompanying drawings where like numerals indicate common elements among the various figures.

FIG. 1 is a flow diagram illustrating steps of a method according to one embodiment of the present invention;

FIG. 2 is a flow diagram illustrating further steps of the method;

DETAILED DESCRIPTION OF THE INVENTION

Figure 3:
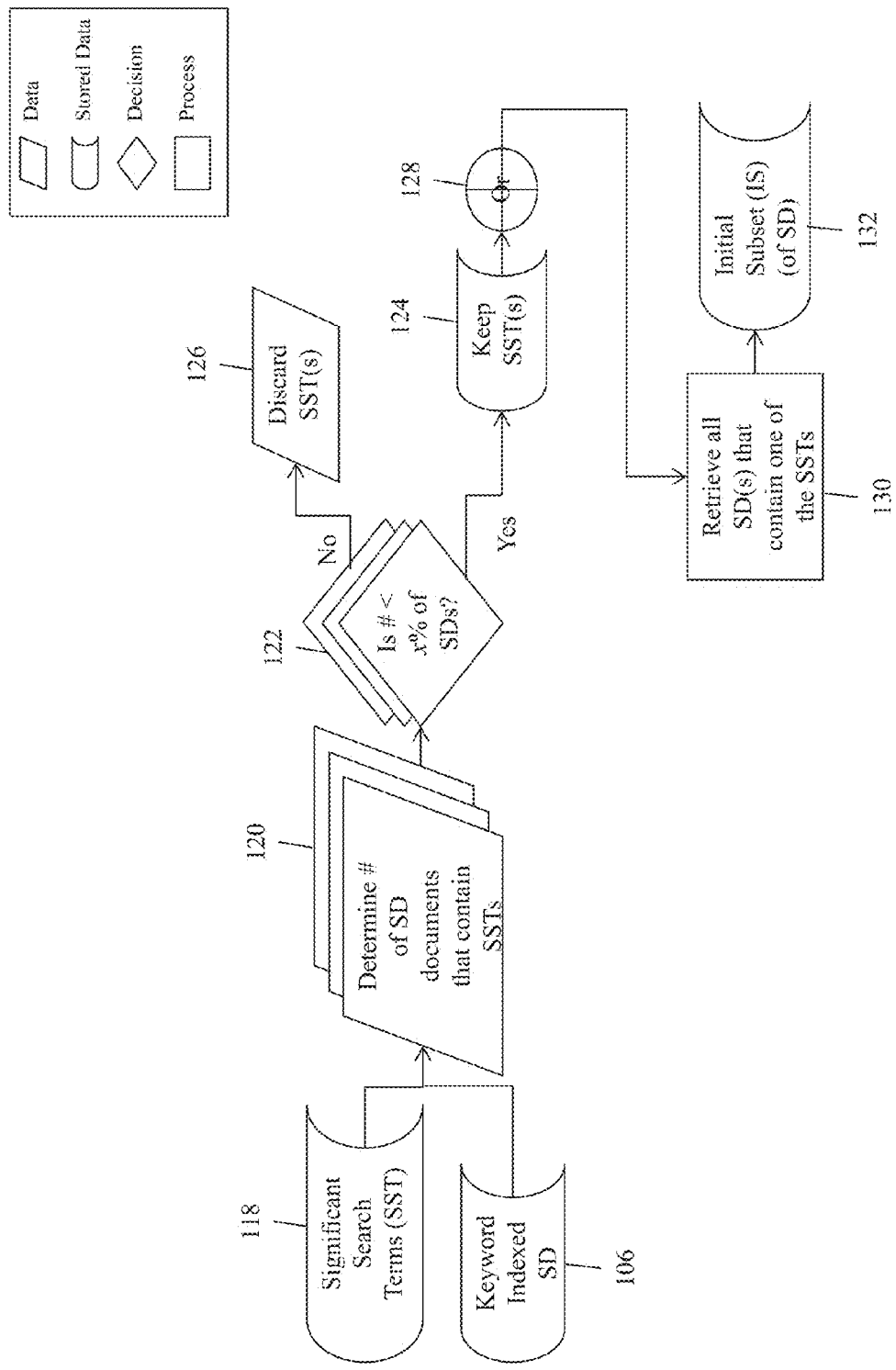
FIG. 3 is a flow diagram illustrating further steps of the method.

One embodiment of a method and system of the present invention is described in connection with the flowchart illustrated in FIGS. 1-6. Generally speaking, a method 100 for filtering and recommending documents includes indexing a plurality of source documents, selecting a seed document, performing Term Frequency-Inverse Corpus Frequency (TF-ICF) to generate one or more document vectors, and comparing and filtering the vectors and documents to return a subset of documents from the plurality of source documents that are closely related to the seed document and contain a reasonable or manageable number of documents, yet have variety and accuracy. TF-ICF can be described as a numerical statistic that weights the importance of a term to a document within a collection or corpus, separate from the source documents. The TF-ICF value increases proportionally to the number of times a word appears in the document (i.e. the term frequency), but is offset by the frequency of the word within the corpus (the inverse corpus frequency), which compensates for some words or terms being generally more common than others.

Indexed terms can include a word, phrase, or alphanumerical term. They can be created by analyzing the document either manually with subject indexing or automatically with automatic indexing or other more sophisticated methods of keyword extraction. Keywords may be stored in a search index. Common words such as articles (a, an, the) and conjunctions (and, or, but) may not be treated as keywords because it is inefficient to do so. Additionally, a corpus is a collection of writings, words, or sentences that are assumed to be representative of and useful for lexical, grammatical, or other linguistic analysis.

A seed document is a document, or set of documents, that contains information that is of significant interest to a user. A document vector is a mathematical representation of the term frequencies of a document. For example, a document vector can be represented by a list of words and the number of times each word appears in the document. Source documents are the documents that make up the pool of documents that are being searched and that may contain information of interest to the user. A seed document vector(s) and source document vectors refer to the document vectors of the seed document(s) and the document vectors of the source documents, respectively.

Where document vectors are generated, the steps of obtaining seed document vectors or source document vectors may include obtaining documents, processing the documents, and generating the document vectors. Documents can be obtained from essentially any source and the way in which a user obtains documents can vary from application to application. For example, seed documents or source documents can be obtained from the Internet, or another database. In one example, a publicly available research paper can be used as the seed document, i.e. a document of interest chosen by the user of the system. The seed document can be downloaded to a local computing machine, converted to text files, and stored on a local computing machine. The document may be stored in a local or remote database. Although one seed document was chosen in this example, additional documents can be used as a plurality of seed documents. In one embodiment, documents may be scanned using a scanner and processed with optical character recognition software.

As another example, the system and method may include gathering a collection of source documents to be searched. For example, the source documents can be obtained from the Internet or other sources, such as a database. The source of the documents may be static, meaning that no additional documents are added over time, or may be dynamic, meaning that documents may be added or deleted from the source over time. For example, source documents can be obtained from one or more Really Simple Syndication ("RSS") feeds. In one embodiment, the source documents include several thousand RSS feeds as the source. In one example, these entries can be downloaded to a local computing machine and stored in a local database.

The content of the documents can vary from application to application. For example, when a plurality of seed documents is used, the documents can be related or unrelated to one another. That is, the seed documents may include a plurality of documents with disparate subject matter relative to one another, a plurality of documents with similar subject matter relative to one another, or a combination of some seed documents with disparate subject matter relative to other seed documents and some seed documents with similar subject matter relative to other seed documents. As another example, the source documents can be related to a certain topic, be derived from a particular source or set of sources, or be a random sampling of publicly available documents, for example, source documents available on the Internet.

Before generating a document vector, the documents may undergo some processing. For example, in one embodiment, the system iterates through each of the seed documents, performing a number of steps, including the removal of stop words and the stemming of terms. Then, after processing, the document vector can be generated for each seed document.

In the current embodiment, a document vector can be generated for a document using the Term Frequency-Inverse Corpus Frequency (TF-ICF) method, as disclosed in U.S. Pat. Nos. 7,693,903 and 7,805,446, which were incorporated by reference above. TF-ICF does not require term frequency information from other documents within the set, and thus it can process document streams in linear time.

In another embodiment, predetermined seed document vectors and source document vectors can be received. Generating document vectors may be unnecessary, for example, if they have already been generated previously. Document vectors, either seed document vectors or source document vectors, can be received by retrieving them from memory. For example, a database of document vectors may be available. The database may be available internally in memory of the computer handling the search or alternatively may be available externally in memory of a different system.

Some embodiments can include a combination of receiving predetermined document vectors and generating document vectors. For example, in some embodiments, predetermined source document vectors are received and seed document vectors are generated. In other embodiments, some source document vectors and/or seed document vectors are generated and some predetermined source document vectors and/or predetermined seed document vectors are received.

The similarity between a seed document and a source document can be ascertained by comparing the seed document vector and the source document vector. This can also be referred to as a search. Perhaps the comparison can be best understood in connection with FIG. 1-6, which illustrates a representative flow diagram where (SD) represents source documents and (SdD) represents seed documents.

Referring to FIG. 1, a method 100 for filtering and recommending documents begins with receiving and indexing a plurality of source documents 102 using any suitable keyword indexing tool to provide a means for searching the source documents 102. The source documents 102 are indexed 104 to create a keyword index of source documents 106. Alternatively, if the source documents 102 have previously been indexed, the method 100 may begin with obtaining the keyword index of source documents 106.

Referring to FIG. 2, the method 100 continues with receiving a seed document 110, performing Term Frequency-Inverse Corpus Frequency (TF-ICF) 112 to generate a single seed document vector 114 having a plurality of weighted terms, and determining 116 a plurality of significant search terms 118 from the plurality of weighted terms. The determining 116 step includes selecting and extracting a predetermined measure of the highest weighted terms from the seed document 110. The predetermined measure can be a static or dynamic number of documents, a static or dynamic percentage of documents, or essentially any other quantifiable measure. In the illustrated example, the predetermined measure is a user selected number n, where the n highest weighted terms are extracted to generate the list of significant search terms 118. For example, the top 100 terms may be extracted. Alternatively, the predetermined measure could be a top percentage of the total number of search terms, or any other user defined criteria for selecting only a portion of the weighted terms. The terms in the list of significant search terms 118 are simply a listing of the most significant keywords found within the seed document 110. Performing TF-ICF on the seed document 110 results in a list of weighted terms that occur frequently in the seed document 110, but compensates for words that occur frequently within the set of corpus documents. A word may have a high term frequency, but if that word occurs in a large number of the corpus documents then the inverse corpus frequency will lower the weight because it is a less useful term. If it occurs in most of the source documents. If a word has a high term frequency, and the word occurs infrequency in the corpus documents, then the inverse corpus frequency will increase the weight of that term.

Referring now to FIG. 3, the method 100 continues with filtering the significant search terms 118. Using the significant search terms 118 and keyword index of source documents 106, a number 120 of source documents 102 that contain a significant search term 118 is determined. This number 120 is determined for each of the significant search terms 118. Next, the number 120 is evaluated relative to a predetermined measure of the total number of source documents 102. If the number 120 in 122 is less than the predetermined measure of the total number of source documents 102, then the significant search term associated with the number 120 is retained 124. However, if the number 120 is greater than the predetermined measure of the total number of source documents 102, then the significant search term associated with the number 120 is discarded 126. In the illustrated example, the predetermined measure is a user selected percentage x of the number of source documents. For example, the percentage may be about 10%, 50%, or 85%. The measure can be tailored based on the application. For example, the measure can be tailored to ensure that the most common, and therefore not particularly useful, search terms are filtered out. It is notable that this can be accomplished without vectorizing the source documents. Alternatively, the predetermined measure could be the top, bottom, or a range x of the weighted terms search terms, or any other user defined criteria for selecting only a portion of the weighted terms.

Using the retained significant search terms 124, an "OR" query 128 is created to retrieve 130 all of the source documents 102 that contain at least one of the retained significant search terms 124. These retrieved documents create an initial subset 132 of the source documents that may be of interest to the user. Accordingly, the initial subset 132 includes only the documents that contain the retained significant search terms 124. Further, the method steps that result in the initial subset 132 provide that the set of documents includes some variance in the keywords. In other words, the method removes the most popular keywords (and their associated documents) so that some degree of variety is provided in the set of documents.

Figure 4:
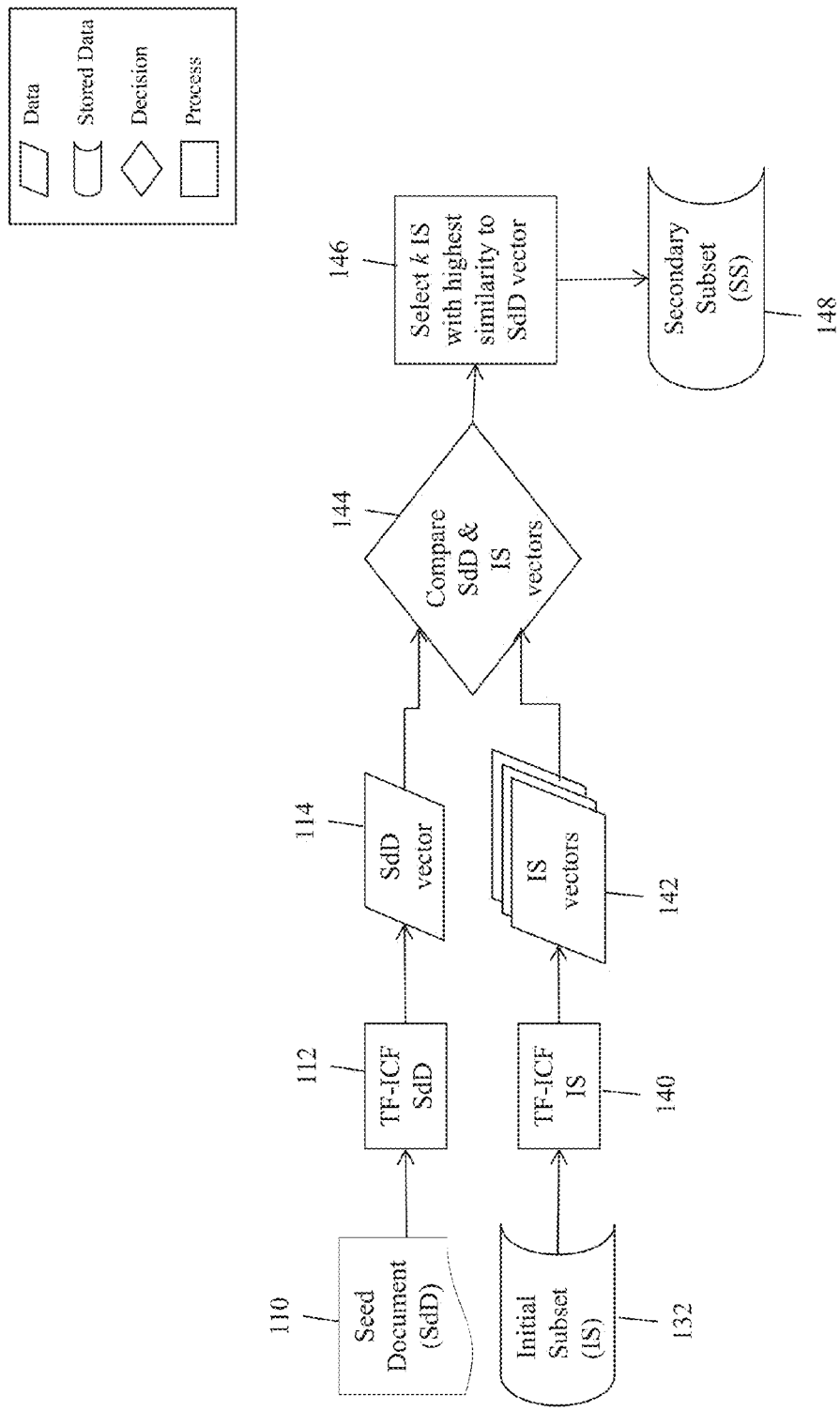
FIG. 4 is a flow diagram illustrating further steps of the method.

Referring now to FIG. 4, the method 100 continues by creating a filtered subset from the initial subset 132. Performing TF-ICF 140 on the initial subset 132 generates a plurality of initial subset vectors 142. The initial subset vectors 142 are compared 144 to the previously generated seed document vector 114. Alternatively, the seed document vector 114 may be generated again using TF-ICF, as described above. Each of the initial subset vectors 142 is then compared to the seed document vector 114 using a dot product of the two vectors to obtain a similarity value that represents the similarity of the terms within the two sets of documents. The result can be recorded as a similarity value, for example including <seed document name or ID>, <source document name or ID>, and <similarity>. This process can be iterated to generate a similarity value for every combination of initial subset document and seed document.

The results of the comparison can be sorted based on the similarity values. For example, in embodiments where similarity values are recorded, the similarity values can be sorted from highest to lowest, so that the similarity value with the most similar seed and source documents are at the top of the list. This can simplify the review by the user or a piece of software of the most relevant document for each of the seed documents. In alternative embodiments, the results can be sorted differently.

The sorted results of the similarity values can then be used to create a secondary subset 148 from the initial subset 132. The secondary subset 148 is created by selecting 146 documents from the initial subset 132 based on a predetermined measure of similarity values. The selecting 146 step includes selecting and extracting a predetermined measure of the initial subset vectors 142 documents having the highest similarity values to the seed document vector 114. In the illustrated example, the predetermined measure is a user selected number k, where the k highest similarity vectors are extracted to generate the secondary subset 148 of documents. For example, the top 100 initial subset vectors 142 having the highest similarity value may be extracted. Alternatively, the predetermined measure could be a top percentage of the total number of initial subset vectors 142, or any other user defined criteria for selecting only a portion of the initial subset vectors 142.

Figure 5:
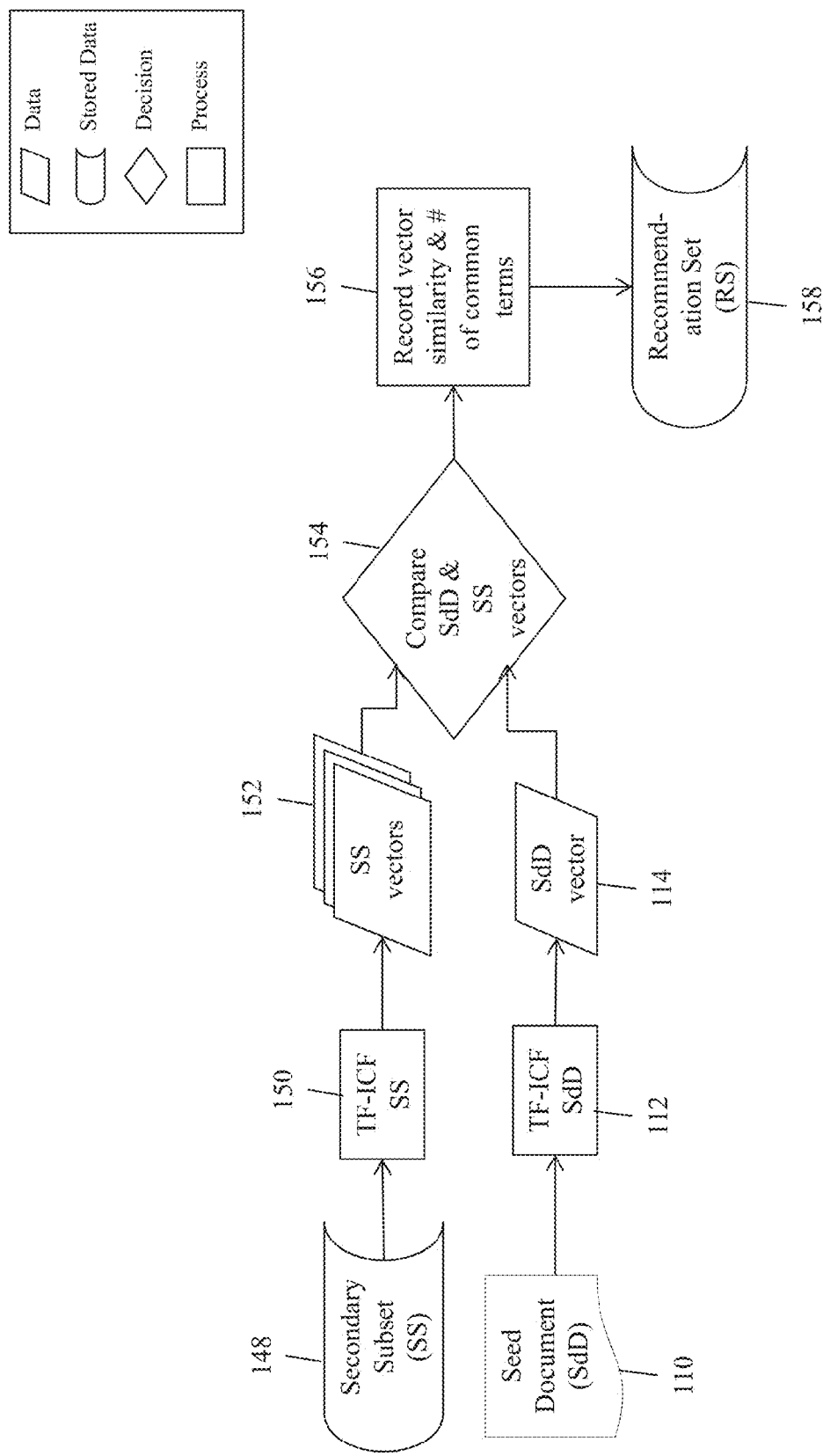
FIG. 5 is a flow diagram illustrating further steps of the method.

Referring now to FIG. 5, the method 100 continues by filtering the secondary subset 148 to create a recommendation set 158. Performing TF-ICF 150 on the secondary subset 148 generates a plurality of secondary subset vectors 152. The secondary subset vectors 152 are compared 154 to the previously generated seed document vector 114. Alternatively, the seed document vector 114 may be generated again using TF-ICF, as described above. Each of the secondary subset vectors 152 is compared 154 to the seed document vector 114 using a dot product of the two vectors to obtain a second similarity value that represents the similarity of the terms within the two sets of documents. The result can be recorded 156 as a second vector similarity value. Additionally, the number of common terms between the secondary subset 148 and the seed document 110 can be recorded. This process can be iterated to generate similarity values and number of common terms for every combination of secondary subset document and seed document. Accordingly, the recommendation set 158 includes a plurality of documents each having an associated similarity value and number of common terms. For example, the recommendation set 158 list may contain <seed document name or ID>, <source document name or ID>, <similarity value>, and <# of common terms> for each document contained in the recommendation set 158.

Figure 6:
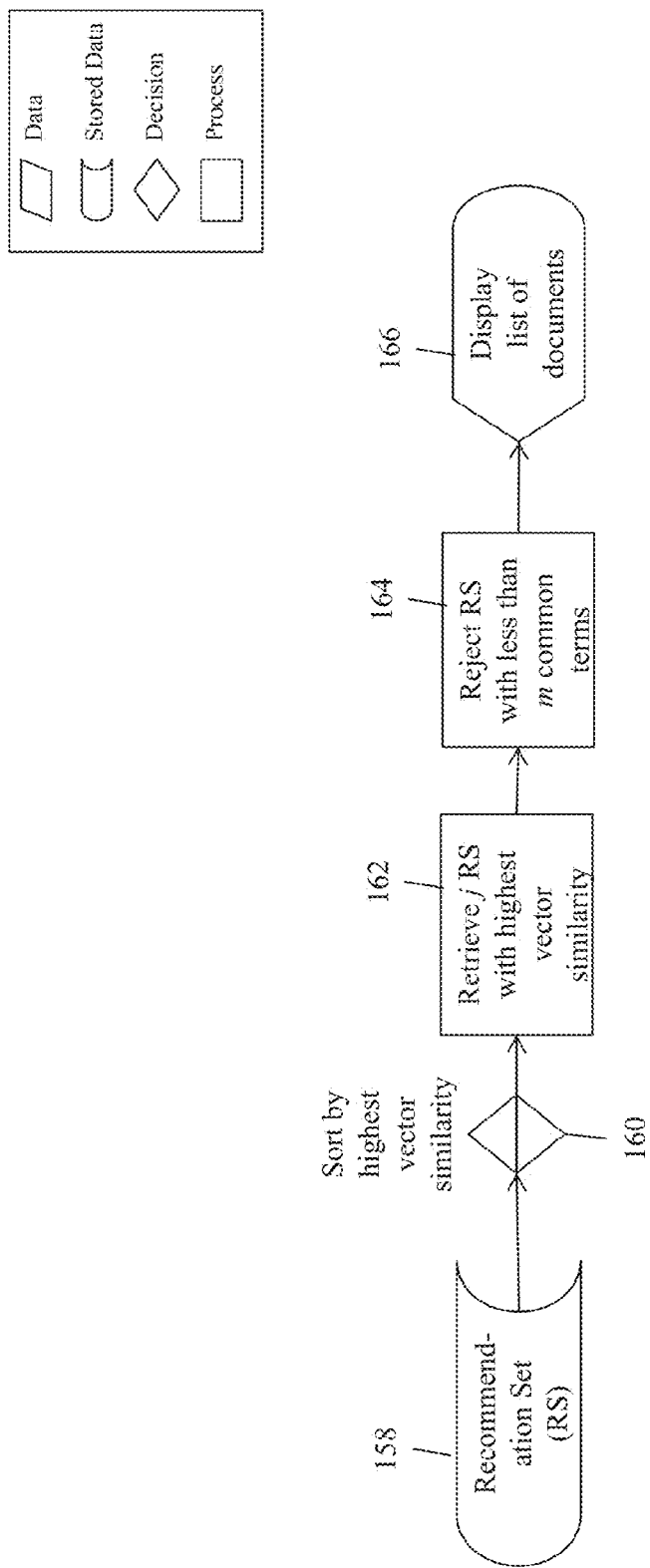
FIG. 6 is a flow diagram illustrating the last steps of the method.

Referring now to FIG. 6, the method 100 continues by outputting only the most relevant documents. The recommendation set 158 is sorted 160 based on the vector similarity values; for example, from highest to lowest, so that the similarity vectors with the most similar seed and recommendation set documents are at the top of the list. The sorted 160 results can then be used to further filter the recommendation set 158 by selecting or retrieving 162 recommendation set 158 documents based on a predetermined measure of vector similarity values. The retrieving 162 step includes selecting only a portion of the recommendation set 158 documents having the highest similarity values to the seed document vector 114. In the illustrated example, the predetermined measure is a user selected number j, where the j highest similarity vectors are selected. For example, the top 10 recommendation set 158 documents having the highest similarity value may be retained. Alternatively, the predetermined measure could be a top percentage of the total number of recommendation set 158 documents, or any other user defined criteria for selecting only a portion of the recommendation set 158.

These filtered results may again be filtered by rejecting 164 those of the recommendation set 158 documents having less than a predetermined measure of common terms relative to the seed document 110. In the illustrated example, the predetermined measure is a user selected number m, where documents containing only the m lowest common terms are discarded. For example, recommendation set 158 documents having the fewer than 10 common terms may be rejected. Alternatively, the predetermined measure could be a lower percentage of the total number of common terms, or any other user defined criteria for retaining only a portion of the recommendation set 158.

The source documents remaining after having been filtered to keep only the documents having the j highest similarity vectors and having discarded the m lowest common terms, make up the list of finally selected documents, referred to as the output 166. The output 166 can be displayed for the user and can be produced in a variety of different formats. For example, the output can be produced in XML format so that an RSS Reader can format the XML. This can allow for easy Internet access to the recommendations. As another example, the output can be provided in a text file.

The output 166 of source documents is made based on the similarity of the individual seed document to the source documents, as opposed to outputs based on the similarity of a collection of seed documents to the source documents. That is, the individual seed document vectors and their similarity to the source documents can be preserved.

In another embodiment, multiple seed documents may be used in method 200. The method 200 is similar to method 100, described above, therefore, like steps will be identified with like numerals increased by 100. It should be understood that the description of the like steps of the first method 100 applies to the second method 200, unless otherwise noted.

The method 200 begins with multiple source documents 102 and one or more seed documents 210. The method 200 continues through steps 102-148 as described above for the first method 100. In method 100 step 112 where TF-ICF is used to create a vector of the seed documents 110, a single seed document vector 114 is generated. The same process is used in method 200, despite the fact that multiple seed documents are used. In either method, a single seed document vector 114, 214 is generated, regardless of the number of seed documents.

Figure 7:
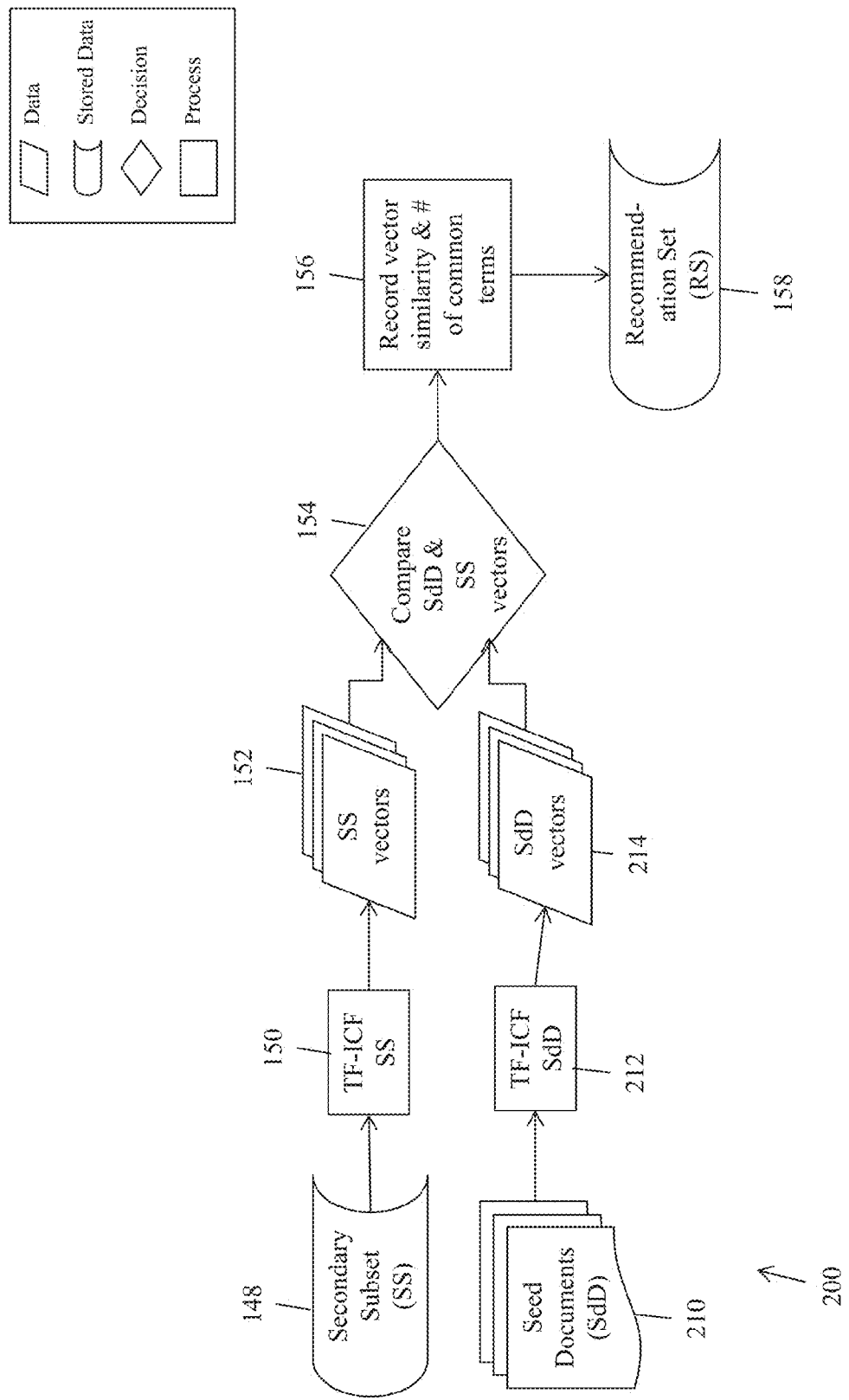
FIG. 7 is a flow diagram illustrating steps of a method according to another embodiment of the present invention.

Referring to FIG. 7, the method 200 includes performing TF-ICF 212 on the multiple seed documents 210 to generate a plurality of seed document vectors 214. Each of the secondary subset vectors 152 is compared 154 to each of the seed document vectors 214 using a dot product of the two vectors to obtain a second similarity value that represents the similarity of the terms within the two sets of documents. As in method 100, the result can be recorded 156 as a second vector similarity value and the number of common terms between the secondary subset 148 and the seed documents 210 can be recorded. This process can be iterated to generate similarity values and number of common terms for every combination of secondary subset document and seed document. Accordingly, the recommendation set 158 includes a plurality of documents each having an associated similarity value and number of common terms. For example, the recommendation set 158 list may contain <seed document name or ID>, <source document name or ID>, <similarity value>, and <# of common terms> for each document contained in the recommendation set. Additionally, each seed document 210 has associated with it a set of documents contained within the recommendation set 158. In other words, each seed document 210 "recommends" one or more of the source documents 102 with an indication of the similarity value.

The methods described above can advantageously strike a balance between providing a reasonable number of documents for the user to review (too many documents is cumbersome), providing a degree of variety in the outputted documents (so that all of the documents aren't related to only a narrow subject), yet maintaining the accuracy of the recommended documents. Additionally, using TF-ICF, as opposed to other term weighting schemes, throughout the above-described method means that the full set of source documents never has to be processed, therefore saving computation time. This is especially significant when considering that the source documents are typically a dynamic set of documents. In using other weighting schemes, every time a document is added or deleted from the source document set the entire method would have to be rerun. For example, consider the known weighting scheme Term Frequency-Inverse Document Frequency (TF-IDF). The computational complexity of TF-IDF for generating representations for N dynamic documents is $O(N^2)$; comparatively, the computational complexity of TF-ICF is $O(N)$.

Figure 8:
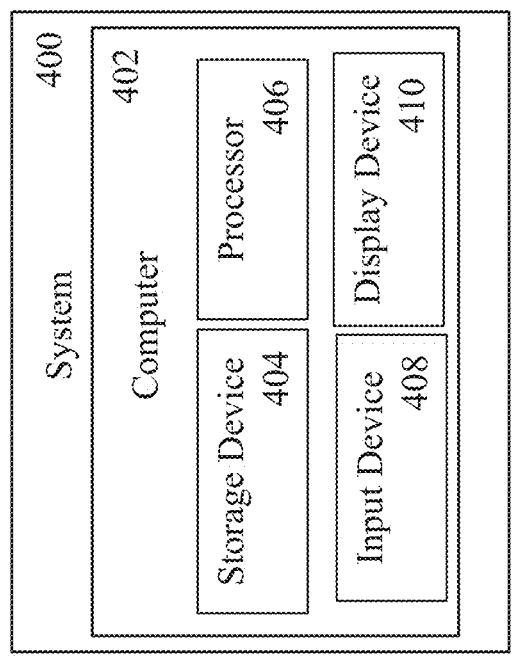
FIG. 8 is a system diagram in accordance with an exemplary system of the present invention.

Referring to FIG. 8, a computer apparatus 402 is part of a system 400 used to execute a series of commands representing the method steps described above. The computer 402 may be a mainframe, a super computer, a PC or Apple Mac personal computer, a hand-held device, a smart phone, or another central processing unit known in the art. The computer 402 is programmed with a series of instructions that, when executed, cause the computer 402 to perform the method steps as described and claimed in this application. The instructions that are performed are stored on a machine-readable data storage device 404. In the illustrated embodiment, the computer 402 includes a processor 406, input device 408, and a display device 410.

The machine-readable, non-transitory data storage device can be a portable memory device that is readable by the computer apparatus. Such portable memory device can be a compact disk (CD), digital video disk (DVD), a Flash Drive, any other disk readable by a disk driver embedded or externally connected to a computer, a memory stick, or any other portable storage medium currently available or yet to be invented. Alternately, the machine-readable data storage device can be an embedded component of a computer such as a hard disk or a flash drive of a computer.

The computer and machine-readable data storage device can be a standalone device or a device that is imbedded into a machine or system that uses the instructions for a useful result. The computer may be part of a larger system or network of connected computers.

While this disclosure describes and enables several examples of a system and method for recommending and discovering interesting documents, other examples and applications are contemplated. Accordingly, the invention is intended to embrace those alternatives, modifications, equivalents, and variations as fall within the broad scope of the appended claims. The technology disclosed and claimed herein is available for licensing in specific fields of use by the assignee of record.

What is claimed is:

1. A computer programmed with a series of instructions that, when executed by a processor, cause the computer to perform the method steps comprising:
obtaining a keyword index for a plurality of source documents;
obtaining a seed document;
generating a seed document vector with a plurality of weighted terms using term frequency-inverse corpus frequency weighting;
determining a plurality of significant search terms from the plurality of weighted terms;
filtering the significant search terms found in the keyword index to retain only the significant search terms that occur in less than a predetermined measure of the total number of source documents to define an initial subset of source documents;
generating initial subset vectors and comparing each of the initial subset vectors to the seed document vector to obtain a similarity value for each comparison;
recommending one or more of the source documents from the initial subset based on the similarity value;
wherein recommending one or more of the source documents includes generating secondary subset vectors using term frequency-inverse corpus frequency weighting;
comparing each secondary subset vector to the seed document vector, and recording a vector similarity value and a number of common terms for each comparison, thereby creating a recommendation set;
generating recommendation set vectors using term frequency-inverse corpus frequency weighting;
comparing each of the recommendation set vectors to the seed document vector to obtain a similarity value for each comparison;
sorting the similarity values;
selecting source documents based on a predetermined measure of similarity values;
rejecting source documents having less than a predetermined measure of common terms relative to the seed document; and
displaying one or more of the source documents.

2. The computer of claim 1, wherein determining the plurality of significant search terms includes selecting a predetermined measure of the highest weighted terms from the seed document.

3. The computer of claim 1, wherein filtering the significant search terms includes:
determining for each of the significant search terms the number of source documents that contain the significant search term; and
retaining only the significant search terms for which the number is less than a predetermined measure of the total number of source documents.

4. The computer of claim 3, wherein the predetermined measure is a percentage of the total number of source documents.

5. The computer of claim 3, wherein the initial subset includes only the source documents containing the retained significant search terms.

6. The computer of claim 1, further including creating a secondary subset from the initial subset by comparing each of the initial subset vectors to the seed document vector to obtain a comparison value, and selecting source documents based on a predetermined measure of similarity values.

7. The computer of claim 1, wherein the initial subset vector is generated using term frequency-inverse corpus frequency weighting.

* * * * *